INVENTOR
Howard E. Kuehn
BY Delio and Montgomery
ATTORNEYS

Dec. 13, 1966 H. E. KUEHN 3,290,897
DRIVE FOR SHELL TYPE ROLLS
Filed May 26, 1965 2 Sheets-Sheet 2

INVENTOR
Howard E. Kuehn
BY Delio and Montgomery
ATTORNEYS

United States Patent Office 3,290,897
Patented Dec. 13, 1966

---

3,290,897
DRIVE FOR SHELL TYPE ROLLS
Howard E. Kuehn, Orange, Conn., assignor to Farrel Corporation, Ansonia, Conn.
Filed May 26, 1965, Ser. No. 458,996
12 Claims. (Cl. 64—9)

This invention relates to calender rolls, and more particularly relates to calender rolls of the shell type, and a bearing support and drive arrangement therefor.

In calender rolls of the shell type which comprise an inner stationary shaft or core and an outer shell rotatable thereabout, some difficulty may be presented in efficiently supporting the ends of the stationary shaft and making a driving connection to the outer shell about the end of the stationary shaft. A calender roll of the general type under discussion is disclosed in U.S. Patent 2,908,964 to Appenzeller. In this type of roll the outer shell and the inner shaft define an annular cavity which is partitioned by sealing means to allow the introduction of pressure transmitting fluid therein. The purpose of this arrangement is to produce a localized pressure along the length of the rotating shell where it is subjected to deflecting forces during calendering operations, and thereby prevent undesired deflection of the shell roll.

While such a structure is quite effective in maintaining uniform nip pressure along the length of a roll, this arrangement requires that the inner core project beyond the ends of the rotating roll shell. This structure presents a problem of providing drive means for the rotating roll while coaxially supporting the shaft drive means and the calender roll. Of course, the shaft and the hollow roll will not always be coaxial during operation thereof.

The present invention provides a new and improved arrangement for supporting a roll of the type described and for drivingly connecting a driving member to the outer rotatable roll shell, said connection being so arranged that it permits deflection of the inner shaft and yet maintains a driving connection between the driving means and the outer roll shell. The invention further provides new and improved roll driving means and bearing supports therefor, together with a power transmitting member and housing member defining a lubricant retaining cavity which allows all lubricant-using elements to be lubricated with a common lubricant.

Accordingly, an object of the invention is to provide a new and improved driving arrangement for a calender roll of the type described.

Another object of the invention is to provide new and improved mounting and bearing means for a calender roll of the type described.

Another object of this invention is to provide a new and improved bearing and drive arrangement for a calender of the type described.

A further object of the invention is to provide a new and improved support and drive means for a calender roll of the type described, including new and improved housing means which defines a lubricant reservoir for all the lubricant-consuming elements thereof.

The features of the invention which are believed to be novel are set forth with particularity and distinctly claimed in the concluding portion of the specification. However, the invention both as to its organization and operation, together with further objects and advantages thereof, may best be appreciated by referring to the following detailed description taken in conjunction with the drawings, in which:

Figure 1:
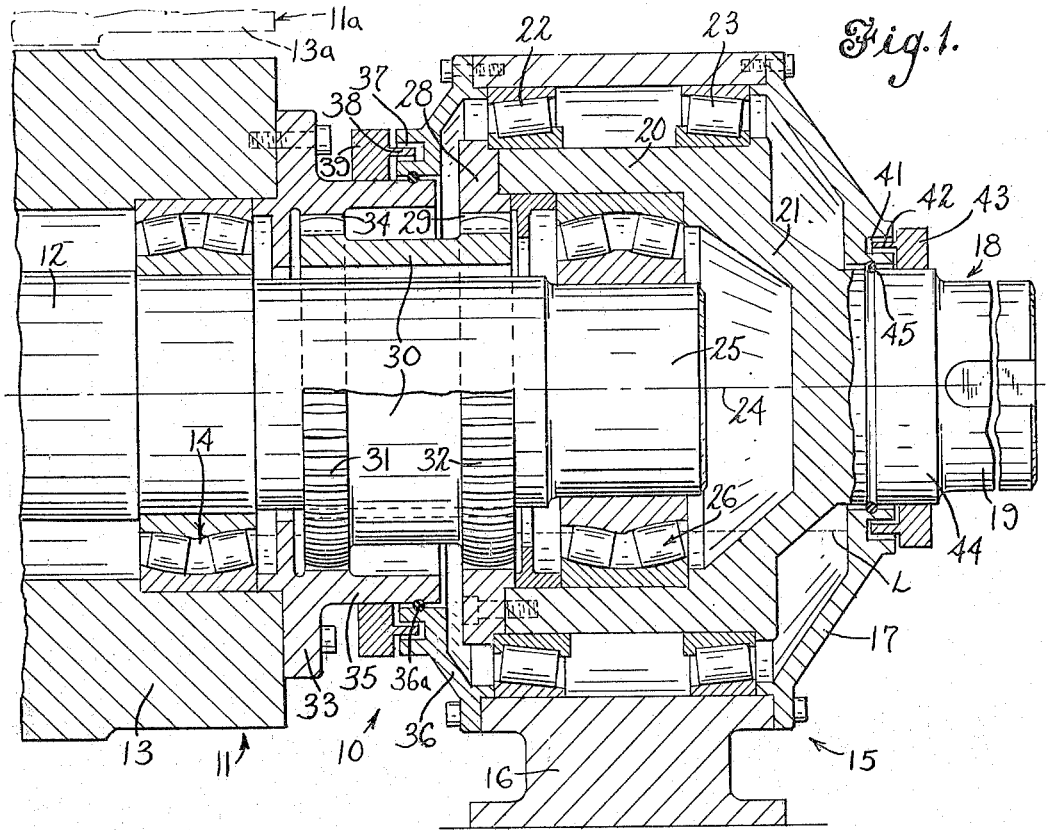
FIG. 1 is a front elevation in half section of the end portion of a calender including a shell type calender roll and mounting and drive means therefor.

A calender embodying the invention is generally indicated by the reference numeral 10 and comprises a shell type calender roll 11 and a cooperating roll 11a, indicated in broken line. Roll 11 comprises an inner core or shaft 12 and an outer hollow roll portion or shell roll 13. Only the drive end of roll 11 is herein illustrated.

Shaft 12 is held stationary in support means at the other end thereof, not shown, and shell 13 is rotatably mounted thereon by bearing assemblies 14 at either end thereof (only one shown). A roll support and drive means comprises a housing 15 shown on a pedestal 16. Housing 15 comprises an end cover member 17, secured to pedestal 16, having a central opening therethrough, through which extends a drive member 18. Drive member 18 comprises a shaft portion 19, an annular cylindrical portion 20 and a connecting portion 21 therebetween. The annular portion 20 may be made integral with connecting portion 21 or separately formed and connected thereto as by means of bolts (not shown). Annular portion 20 of the driving member is rotatably supported within pedestal 16 by means of bearings 22 and 23 which rotatably mount the driving member about axis 24. As illustrated, bearings 22 and 23 comprise inner and outer races with roller bearing elements therebetween. The inner race is rotatable with portion 20 of drive member 18.

Normally coaxially centered about axis 24 within the cup-shaped recess defined by portions 20 and 21 of the driving member is the end 25 of shaft 12. Bearing assembly 26 which comprises inner and outer races with bearing elements therebetween coaxially centers shaft 12 with respect to drive member 18 and supports shaft portion 25 therein. The bearing elements of bearing assembly 26 have outer surfaces curved along the width thereof and matingly formed race inner surfaces to permit lateral movement of the bearing elements as hereinafter described. Secured to the open end of drive member 18 is a member 28 having internal gear teeth 29 annularly thereon. Drivingly connected to drive member 18 through member 28 is a longitudinally extending coupling member 30 having external gear teeth 31 and 32 on the opposite ends thereof. The teeth 31 and 32 are formed on a radius for purposes hereinafter described. Teeth 32 of member 30 are drivably engaged by internal teeth 29 of member 28. Mounted at the end of roll shell 13 is member 33 having internal annular gear teeth 34 thereon which are drivably engaged by teeth 31 of member 30. Member 33 further includes a flange portion 35 extending axially over connecting member 30. Flange 35 resides within end member 36 carried on pedestal 16 and an O-ring type seal 36a is provided therebetween. End member 36 defines therein an annular open slot 37 which receives therein a projection 38 of sealing member 39 also disposed about flange 35 to provide a further labyrinth type lubricant retaining seal. Defined in end member 17 is an annular open slot 41 which receives therein a projection 42 of a sealing member 43 disposed about a collar 44 on drive shaft 18, to provide a labyrinth type seal. A flexible O-ring type seal 45 is disposed between shaft 18 and end cover 17.

In operation, when shaft 19 is driven it rotates within pedestal 16 on bearings 22 and 23 and annular cylindrical portion 20 drives member 28 which, in turn, engages gear teeth 32 and drives connecting member 30. Gear teeth 31 on connection member 30 engage the teeth 34 of member 33 and, in turn, drive roll shell 13 on bearing assemblies 14 about stationary shaft 12.

Figure 2:
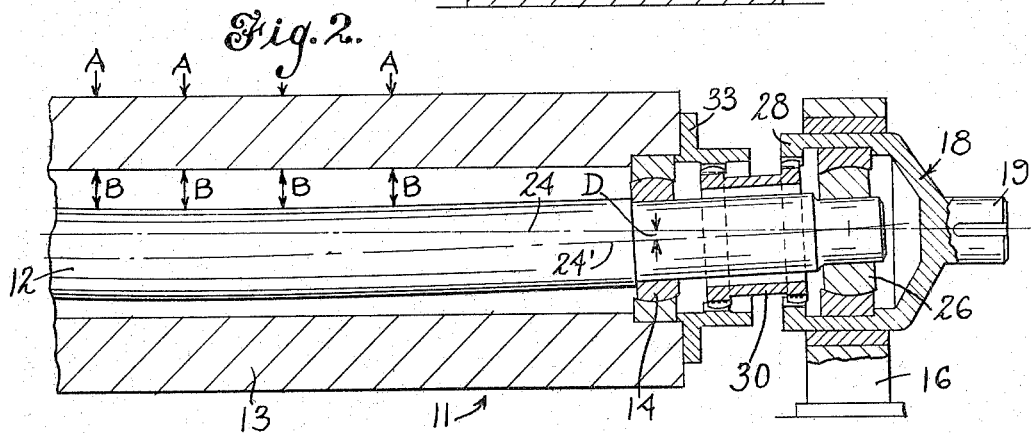
FIG. 2 is a view similar to FIG. 1 but in less detail, set forth to schematically illustrate the operation of the drive means of FIG. 1.

In operation, the nip pressure between shell roll 13 and roll 13a is represented by the vectors A, FIG. 2, on shell roll 13. These forces tend to deflect shell 13 along the length thereof. To combat and prevent this deflection, hydraulic pressure is introduced between the shaft 12 and shell 13 as indicated by the double headed vectors B. The forces represented by the vectors B prevent deflection of the shell 13 and in reacting against shaft 12 will produce deflection thereof as shown in FIG. 2. In FIG. 2 the deflection of shaft 12 has been over-emphasized for purposes of illustration.

The deflection of shaft 12 may best be noted by noting the difference between the axis 24 and the axis 24' upon deflection. The deflection of shaft 12 will be similar to that of a beam uniformly loaded between two points of support. It will be noted that at the center of bearing assembly 14 the axis 24' is the distance D below the normal axis 24 of shaft 12. The bearing assemblies 14 and 26 are so constructed as to allow for this cocking or non-coaxiality of shaft 12 with respect to axis 24. It will be apparent that when bearing assembly 14 moves the distance D from axis 24 to 24' the member 33 must move therewith and it becomes off-center with respect to drive member 18. However, the construction and arrangement of connecting member 30 is such that such misalignment is compensated for as shown in FIG. 2, and the gear teeth 31 and 32 formed on a radius permit such axial misalignment. The radial forming of gear teeth 31 and 32 permits rotation of connector 30 from the normal position shown in FIG. 1 to that schematically illustrated in FIG. 2 without danger of the teeth binding, and further allows continuous driving torque to be transmitted to shell roll 13 despite the axial misalignment of shaft 12.

It may further be seen that with the drive mechanism disclosed, the structure is such that a lubricant retaining cavity is defined in which a common lubricant may be utilized to lubricate all bearings and gears. More specifically, the member 33 and flange 35 thereof, together with member 36, pedestal 16 and end cover 17, define a lubricant reservoir which may have lubricant therein to the height denoted by the dashed line L and such lubricant will serve all the lubricant consuming devices, namely, bearings 22, 23, 26 and gear teeth 31 and 32 and 29 and 34. The lubricant will normally be oil.

In an alternate embodiment, the bearing assemblies 22, 23, 26 and portion 20 may be constructed as a single three race bearing assembly.

Figure 3:
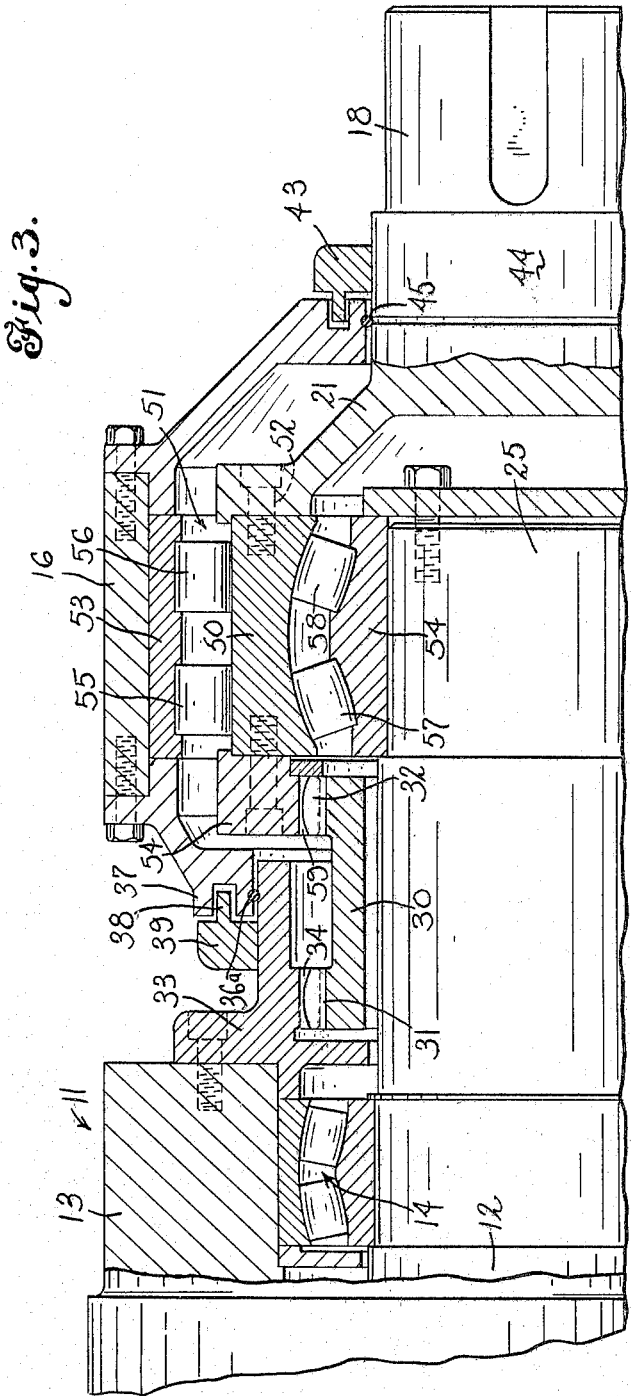
FIG. 3 is a front elevation in quarter section of the end portion of a calender, similar to FIG. 1, showing another embodiment of the invention.

Such construction is shown in FIG. 3 wherein corresponding elements to the structure of FIG. 1 bear corresponding reference numerals. In the structure of FIG. 3 the connecting portion 21 of drive member 18 is secured to the middle race 50 of a three race roller bearing assembly 51, as by a plurality of bolts 52. Bearing assembly 51 comprises a non-rotatable outer race 53 received within pedestal member 16, an inner race 54 on the end portion 25 of shaft 12 and an intermediate race 50 which transmits the torque of drive member 18 to a gear member 54. Interposed between outer race 53 and intermediate race 50 are annular rows of roller bearing elements 55 and 56 and disposed between intermediate race 50 and inner race 54 annular rows of bearing elements 57 and 58. The inner periphery of intermediate race 50 as well as the peripheries of bearing elements 57 and 58 are formed on a radius for reasons heretofore explained and the seats for bearings 57 and 58 in inner race 54 are formed on the same radius.

In operation, driving member 18 transmits torque through connecting portion 21 to intermediate race 50 and annular internal gear 59. Gear 59 engages gear 32 of coupling member 30 and gear teeth 31 of coupling member 30 in turn engages gear teeth 34 on member 33. The operation is the same as that of the structure of FIG. 1 described in conjunction with FIG. 2.

It may thus be seen that the objects of the invention set forth as well as those made apparent from the foregoing description are effectively attained. Modifications to the disclosed embodiment of the invention as well as other embodiments thereof which do not depart from the spirit and scope of the invention may occur to those skilled in the art. Accordingly, the appended claims are intended to cover all modifications to the disclosed embodiment of the invention as well as other embodiments thereof which do not depart from the spirit and scope of the invention.

What is claimed is:

1. A drive mechanism for a shell type calender roll comprising a shaft, a hollow calender roll, bearing means rotatably mounting said hollow roll on said shaft, pedestal means, a driving member rotatably mounted within said pedestal means, bearing means disposed between one end of said shaft and said driving member supporting said end of said shaft on said pedestal through said drive means, torque transmitting means interconnecting said driving member and said hollow roll, and sealing means disposed about said transmitting member and defining with said pedestal means a reservoir for retaining lubricants for all of said bearing means and said torque transmitting means.

2. A drive mechanism for a shell type calender roll comprising a non-rotatable shaft, a hollow calender roll, bearing means rotatably mounting said hollow roll on said shaft, pedestal means, a driving member rotatably mounted within said pedestal means, bearing means disposed between one end of said shaft and said driving member supporting said end of said shaft on said pedestal through said drive and torque transmitting means interconnecting said driving member and said hollow roll, said drive member having annular internal gear teeth thereon, said torque transmitting means comprising a sleeve-like member extending longitudinally about said stationary shaft and having external annular gear teeth at one end thereof drivably engaged with the gear teeth of said driving member, annular internal gear teeth carried on said roll, the other end of said sleeve-like member having annular external gear teeth thereon drivingly engaging the gear teeth on said roll, the gear teeth on said sleeve-like member being formed with a curved outer edge to allow said sleeve-like member to have rotational motion between said internal gears while maintaining a driving connection therebetween.

3. A drive mechanism for a shell type calender roll comprising a non-rotatable shaft, a hollow calender roll, bearing means rotatably mounting said hollow roll on said shaft, pedestal means, a driving member rotatably mounted within said pedestal means, bearing means disposed between one end of said shaft and said driving member supporting said end of said shaft on said pedestal through said drive means, torque transmitting means disposed about said shaft and interconnecting said driving member and said hollow roll, and sealing means disposed about said transmitting member and defining with said pedestal means a reservoir for retaining lubricants for all of said bearing means and said torque transmitting means.

4. In combination, a non-rotatable shaft, a calender roll shell rotatably mounted at either end thereof on said shaft, the ends of said shaft extending beyond said roll shell, drive means at one end of said shaft comprising a rotatable drive shaft, a drive member attached to said drive shaft, a support and housing member, first bearing means rotatably supporting said drive member within said housing member, second bearing means within said drive member coaxially supporting said one end of said shaft in said housing through said drive member, a sleeve-like torque transmitting member disposed normally coaxially about said shaft between said roll shell and directly geared to both said drive member and said roll shell, said drive member and said roll shell being the sole means supporting said sleeve-like member.

5. In combination, a non-rotatable shaft, a calender roll shell rotatably mounted at either end thereof on said shaft, the ends of said shaft extending beyond said roll shell, drive means at one end of said shaft comprising a rotatable drive shaft, a generally cup shaped drive member attached to said drive shaft, a housing member, first bearing means rotatably supporting said drive member within said housing member, second bearing means within said cup shaped member coaxially supporting said one end of said shaft in said housing through said drive member, said drive member having internal annular gear teeth at the open end thereof, a sleeve-like torque transmitting member disposed normally coaxially about said shaft between said roll shell and said drive member and having at one end thereof external annular gear teeth in meshing engagement with the gear teeth on said drive member, a member having internal annular gear teeth connected to said roll shell and being coaxial therewith, the other end of said sleeve-like member having external annular gear teeth thereon meshing with the gear teeth of said member, said drive member and said member being the sole means supporting said sleeve-like member.

6. The combination of claim 5 wherein the gear teeth on said sleeve-like member have the outer edges thereof rounded.

7. In combination, a non-rotatable shaft, a calender roll shell rotatably mounted at either end thereof on said shaft, the ends of said shaft extending beyond said roll shell, drive means at one end of said shaft comprising a rotatable drive shaft, a generally cup shaped drive member attached to said drive shaft, a support and housing member, first bearing means rotatably supporting said drive member within said support and housing member, second bearing means within said cup shaped member coaxially supporting said one end of said shaft in said housing through said drive member, said drive member having internal annular gear teeth at the open end thereof, a sleeve-like torque transmitting member disposed normally coaxially about said shaft between said roll shell and having at one end thereof external annular gear teeth in meshing engagement with the gear teeth on said drive member, a member having internal annular gear teeth connected to said roll shell and being coaxial therewith, the other end of said sleeve-like member having external annular gear teeth thereon meshing with the gear teeth of said member, said drive member and said member being the sole means supporting said sleeve-like member, said member having an annular flange normally coaxially disposed about said sleeve-like member and extending into said support and housing member, said support and housing member and said member cooperating to define a lubricant reservoir about said gears and said bearing means.

8. A drive mechanism for a shell type calender roll comprising a non-rotatable shaft, a hollow calender roll, bearing means rotatably mounting said hollow roll on said shaft, pedestal means, said shaft extending into said pedestal means, a driving member, a bearing assembly disposed about said shaft in said pedestal means, said bearing assembly comprising a rotatable race connected to said driving member at one end of said race, a gear member connected to said rotatable race coaxial therewith, and a coupling member in meshing engagement with said gear member and connected to said shell roll.

9. A drive mechanism for a shell type calender roll comprising a non-rotatable shaft, a hollow calender roll, bearing means rotatably mounting said hollow roll on said shaft, pedestal means, said shaft extending into said pedestal means, a driving member, a bearing assembly disposed about said shaft in said pedestal means, said bearing assembly comprising a rotatable race connected to said driving member at one end of said race, a gear member having internal annular teeth connected to said rotatable race coaxial therewith, and a sleeve coupling member having gears defined at either end thereof in engagement with said gear member and drivingly connected to said shell roll, and sealing means disposed about said transmitting member and defining with said pedestal means a reservoir for retaining lubricants for all of said bearing means and said torque transmitting means.

10. In combination, a shaft, a calender roll shell rotatably mounted at either end thereof on said shaft, the ends of said shaft extending beyond said roll shell, drive means at an end of said shaft comprising a rotatable drive shaft, a housing member, bearing means rotatably supporting said drive member within said housing member, said bearing means comprising a coaxial three race assembly having bearing elements between the outer and intermediate races and between the inner and intermediate race, said outer race being non-rotatably carried within said housing member, said inner race being non-rotatably mounted on said end of said shaft, said drive shaft being connected to said intermediate race, and a sleeve-like coupling member disposed about said shaft and interconnecting said intermediate race and said roll shell.

11. In combination, a non-rotatable shaft, a calender roll shell rotatably mounted at either end thereof on said shaft, the ends of said shaft extending beyond said roll shell, drive means at an end of said shaft comprising a rotatable drive shaft, a housing member, bearing means rotatably supporting said drive member within said housing member, said bearing means comprising a coaxial three race assembly having bearing elements between the outer and intermediate race and between the inner and intermediate race, said outer race being non-rotatably carried within said housing member, said inner race being non-rotatably mounted on said end of said shaft, said drive shaft being connected to said intermediate race, a sleeve-like coupling member disposed about said shaft and interconnecting said intermediate race and said roll shell, the inner periphery of said intermediate race and the bearing seats on said inner race being defined in cross-section by the arc of a radius and the bearing elements therebetween having corresponding surface contours.

12. A drive mechanism for a shell type calender roll comprising a non-rotatable shaft, a hollow calender roll, bearing means rotatably mounting said hollow roll on said shaft, pedestal means, a driving member rotatably mounted within said pedestal means, bearing means disposed between one end of said shaft and said driving member supporting said end of said shaft on said pedestal through said drive means, and torque transmitting means disposed about said shaft and interconnecting said driving member and said hollow roll.

References Cited by the Examiner

UNITED STATES PATENTS

| | | | |
|---|---|---|---|
| 2,676,387 | 4/1954 | McArn | 29—115 |
| 2,778,565 | 1/1957 | Atkinson | 64—1 X |
| 2,809,503 | 10/1957 | Gaubatz | 64—8 X |
| 2,867,999 | 1/1959 | Hoffman et al. | 64—9 |
| 3,117,430 | 1/1964 | Mueller | 64—9 |

FRED C. MATTERN, JR., *Primary Examiner.*

H. C. COE, *Assistant Examiner.*

Disclaimer 3,290,897.—*Howard E. Kuehn*, Orange, Conn. DRIVE FOR SHELL TYPE ROLLS. Patent dated Dec. 13, 1966. Disclaimer filed July 1, 1968, by the assignee, *Farrel Corporation*.

Hereby enters this disclaimer to claims 10, 11 and 12 of said patent.

[*Official Gazette September 3, 1968.*]